Figure 1:
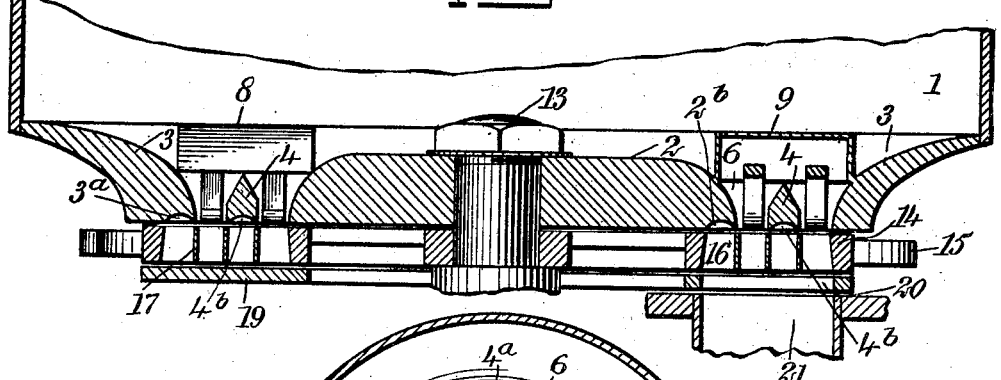

No. 835,979. PATENTED NOV. 13, 1906.
J. M. OPPER.
SEEDING DEVICE.
APPLICATION FILED JULY 18, 1906.

WITNESSES
J. A. Brophy
S. C. Kenou

INVENTOR
John M. Opper
BY Munn & Co
ATTORNEYS

UNITED STATES PATENT OFFICE.

JOHN M. OPPER, OF GRESHAM, NEBRASKA.

SEEDING DEVICE.

No. 835,979.  Specification of Letters Patent.  Patented Nov. 13, 1906.

Application filed July 18, 1906. Serial No. 326,689.

*To all whom it may concern:*

Be it known that I, JOHN M. OPPER, a citizen of the United States, and a resident of Gresham, in the county of York and State of Nebraska, have invented a new and Improved Seeding Device, of which the following is a full, clear, and exact description.

My invention relates to seeding devices adapted to be attached to corn-planters.
In many of the devices heretofore used for selecting and dropping corn into a hill the seed-plate is operated by means of a clutch, which is thrown into and out of engagement with its adjacent members to start and stop the seed-plate between hills. This constant action of the clutch is a source of great inconvenience and trouble at times, and one of the objects of my invention is to dispense with the use of such a clutch entirely.
My invention has for its further object to provide seeding mechanism adapted to select kernels of corn and arrange them edgewise and drop the desired number of kernels into a hill at once and also to provide means for enabling the seed-plate to be operated by the check-rower wire. This I accomplish by the means illustrated in the drawings, in which drawings like characters of reference indicate like parts throughout the views, and in which—

Figure 2:
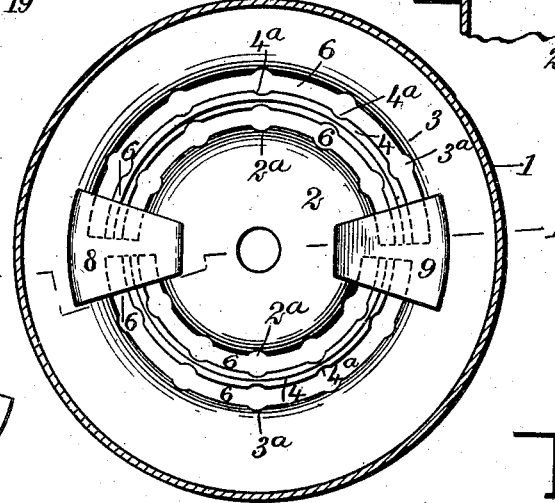
Figure 5:
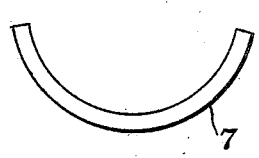
Figure 4:
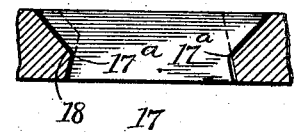
Figure 3:
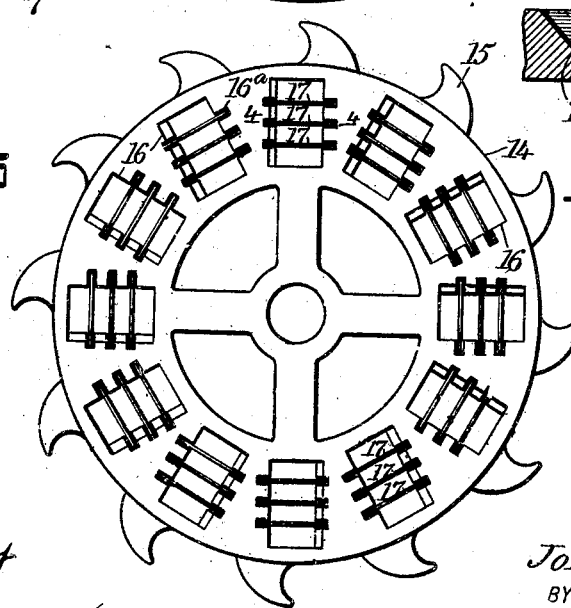
Figure 6:
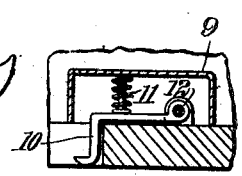

Figure 1 is a vertical transverse section taken on the line 1 1 of Fig. 2. Fig. 2 is a plan view of the bottom of a seedbox, the body of the box appearing in section. Fig. 3 is a plan view of a seed-plate detached from the seed-box. Fig. 4 is a transverse section taken on the line 4 4 of Fig. 3. Fig. 5 is a plan view of a detached blank, and Fig. 6 is a transverse section taken on the line 6 6 of Fig. 2.

As illustrated in the drawings, 1 represents the body of a seed-box, which may be of the usual construction and adapted to be hinged to the frame of a corn-planter, so as to be upended and the seed-plates removed therefrom without removing the seed from the box. The seedbox is provided with a bottom plate having slots 6 extending in the arc of a circle and separated by arc partitions 4.
The slots 6 are arranged in staggered relation with each other, so that the ends of said partitions extend in line with the ends of the opposite slots, as shown in Fig. 2.

A seed-plate 14 is secured beneath the bottom of the seedbox by means of a bolt 13 passing through the bottom of the box and the seed-plate. The seed-plate is provided with openings 16, extending through the plate and in radial lines across the plate. These openings 16 are provided with partitions 17, which divide the openings into sections or cells, each cell of one of the openings registering with one of the curved grooves 6 formed in the bottom of the seedbox. A bearing-plate 19 is also secured, by means of the bolt 13, to the bottom of the seedbox and is provided with an orifice 20, corresponding in outline with one of the openings 16 formed in the seed-plate 14. The bearing-plate 19 is stationary and is made smooth and polished on its upper surface, and the opening 20 is designed to be arranged directly above the mouth of the seed-tube 21, which may be secured to the machine in any suitable manner. The inner walls 3 of the bottom of the seedbox incline downwardly into the curved slots 6, and the central portion 2 of the seedbox-bottom is similarly inclined into the slot 6 adjacent thereto. The upper edges of the partitions 4, formed in the bottom of the feed-box, are also preferably inclined. The purpose of such inclination of a portion of the bottom of the box is to enable the seed to work down readily into the grooves 6. The curved sides of the central and outer portions of the box are preferably cut away at intervals, forming indentations or recesses 2ª and 3ª, which in effect form an enlargement at such portion of the groove, thereby helping to enable the seed to drop readily into the slots 6 without binding together. The slots 6 are made of a width sufficient to enable a kernel of corn to pass through them edgewise, but are not of a width equal to the length or the breadth of a kernel of corn. Such a construction therefore prevents a kernel of corn from passing through said slot except when arranged edgewise. After a kernel has passed through the slot 6 it enters one of the cells formed in the openings 16 of the seed-plate arranged directly below. Each of these cells holds but one kernel of corn, and after the cells arranged directly beneath the slot 6 in the bottom of the seedbox have received the kernels of corn the seed-wheel 14, being rotated on the bolt 13, carries the opening 16 and the corn held in the cells formed in such opening in a rotary path on the bearing-plate 19, which is rigidly secured to the bolt 13. This plate prevents the kernels from dropping out from the cells formed in the seed-wheel 14 until one of the series of cells is brought directly over the mouth of the discharge-tube 21, which is affixed to the frame of the machine. As the wheel 14 is rotated on the bolt or shaft 13 the series of cells pass under cut-offs 8 and 9, which are provided with bent levers 10, pivoted to the bottom of the seedbox, and with spiral springs 11, which keep the lower ends of the levers 10 normally depressed, so as to extend in line or slightly below the level of the under surface of the bottom of the seedbox. Such cut-offs prevent more than one kernel from becoming lodged in each of the cells formed in the seed-wheel. The seed-wheel is rotated on its shaft, preferably by means of sprockets 15, formed thereon, which are adapted to be operated by the check-rower wire.

As shown in the drawings, the seed-plate is adapted to drop four kernels of corn in each hill. Less than four may be dropped, if desired. This is accomplished by means of a curved blank 7, corresponding in length to the exposed portion of the slot 6 and adapted to be inserted in one of such slots, so as to cover the cells of the seed-wheel directly beneath, and thereby regulate the number of kernels of corn in each compartment or series of cells in the seed-wheel. Thus if it is desired to plant but three kernels in a hill one of such slots 6 may be filled by means of the blank. If but two kernels of corn are desired to be dropped into a hill, a similar blank is inserted in one of the adjacent grooves.

The partitions 17, which are arranged in the openings 16 made in he seed-wheel, are preferably connected with such wheel, so as to have a limited lateral movement on the seed-wheel. By means of such construction the partitions may be moved sidewise by a kernel of corn of unusual thickness, and thereby enable the cell to adjust its width to the kernel of corn, so that such kernel may freely pass through the cell and into the discharge-spout 21, arranged beneath the orifice in the bearing-plate 19. The ends of the partitions 17 are preferably provided with notches $17^a$, which engage shoulders 18 formed in the seed-wheel. The ends of the partitions preferably rest in recesses $16^a$ formed in the seed-wheel and wider than the thickness of the partitions, so as to enable such partitions to have a slight lateral movement. The partitions are inserted in place on the seed-wheel by bending them in the direction of their length, then inserting them in the openings 16 of the seed-wheel and bending them straight after they have been so arranged in said openings. Knockers of any desired construction may be secured to the bottom of the seedbox directly over the discharge-orifice of the machine, so as to loosen and discharge from the seed-wheel any corn which may become lodged therein. The under surface of the partitions 4 is preferably provided with a curved groove $4^b$, extending in a circular line corresponding with the circular path traveled by the cell directly underneath said groove, so that if a kernel of unusual size becomes lodged in one of the cells of the seed-wheel such groove will permit the kernel to be carried around by the seed-wheel until it reaches the opening 20 made in the bearing-plate 19, when it may be dislodged by the knockers located in the bottom of the seedbox over said openings. The central portion 2 of the bottom of the seedbox may be provided with a similar groove $2^b$ for the same purpose and a similar groove $3^a$ may be formed in the bottom of the seedbox. By means of such construction a full-hill drop of edgewise selection may be produced and accuracy of drop is thereby accomplished, combined with simplicity of construction and convenience in adjusting the seed-plate, which may be used either for hillwork or for drill-dropping.

Having thus described my invention, what I claim as new, and desire to secure by Letters Patent, is—

1. In a seed-dropping device, a seedbox having a bottom plate provided with staggered arc slots, substantially as shown and described.

2. In a seed-dropping device, a seedbox having a bottom plate provided with staggered arc slots and corresponding separating-partitions, substantially as shown and described.

3. In a seed-dropping device, the combination of a seedbox having a bottom plate provided with staggered arc slots, and a seed-plate having a series of openings provided with partitions adapted to form cells registering with said slots, substantially as shown and described.

4. In a seed-dropping device, a seed-plate having a series of openings extending through said plate in radial lines and provided with transverse partitions forming a series of cells in said openings, substantially as shown and described.

5. In a seed-dropping device, a seed-plate having a series of openings extending through said plate in radial lines and provided with transverse partitions having a limited lateral movement in said openings forming cells variable in width, substantially as shown and described.

6. In a seed-dropping device, a seed-plate having a series of openings extending through said plate in radial lines thereof, transverse partitions arranged in said openings to form cells therein, and sprockets secured to the periphery of said plate, substantially as shown and described.

7. In a seed-dropping device, the combination with a seedbox having a bottom plate provided with staggered arc slots, of a revoluble seed-plate provided with a plurality of series of cells adapted to register with said slots, and cut-offs connecting with said seed-plate, substantially as shown and described.

8. The combination with a seedbox provided in its bottom with curved slots extending in circular lines, of a rotary seed-plate provided with a multiple series of cells adapted to register with said slots, a bearing-plate adapted to bear against the under surface of said seed-plate, provided with a discharge-orifice adapted to register with a series of cells, and a detachable blank adapted to be inserted in one of the slots of the seed-plate, substantially as shown and described.

9. In a seed-dropping device, the combination with a seedbox provided with a bottom plate having staggered arc slots, of a revoluble seed-plate provided with a plurality of series of cells adapted to register with said slots, and provided on its outer edge with a series of sprockets corresponding in number with a series of cells, and a bearing-plate adapted to bear against the under surface of said seed-plate, and provided with an opening adapted to register with each series of cells, substantially as shown and described.

In testimony whereof I have signed my name to this specification in the presence of two subscribing witnesses.

JOHN M. OPPER.

Witnesses:
J. E. HART,
C. H. DAVIDSON.